(12) United States Patent
Yoo et al.

(10) Patent No.: US 9,606,722 B2
(45) Date of Patent: Mar. 28, 2017

(54) PORTABLE DISPLAY DEVICE AND METHOD OF OPERATING THE SAME

(71) Applicant: Samsung Display Co., Ltd., Yongin, Gyeonggi-Do (KR)

(72) Inventors: Hee Soo Yoo, Seoul (KR); Hyun Jae Lee, Seoul (KR); Mu Gyeom Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/464,957

(22) Filed: Aug. 21, 2014

(65) Prior Publication Data
US 2015/0227281 A1 Aug. 13, 2015

(30) Foreign Application Priority Data
Feb. 11, 2014 (KR) .................. 10-2014-0015558

(51) Int. Cl.
*G06F 3/0488* (2013.01)
*G06F 1/16* (2006.01)
(Continued)

(52) U.S. Cl.
CPC .......... *G06F 3/0488* (2013.01); *G06F 1/1647* (2013.01); *G06F 3/0483* (2013.01); *G06F 3/0485* (2013.01)

(58) Field of Classification Search
CPC ................. G06F 3/0488; G06F 3/0412; G06F 2203/04102; G06F 2203/04802; G06F 1/1613
(Continued)

(56) References Cited

U.S. PATENT DOCUMENTS 7,411,567 B2 * 8/2008 Okude .................. G06F 3/1431
345/1.3
7,884,808 B2 2/2011 Joo
(Continued)

FOREIGN PATENT DOCUMENTS

JP 2013-161141 A 8/2013
KR 1020090005680 A 1/2009
(Continued)

*Primary Examiner* — Stephen Sherman
(74) *Attorney, Agent, or Firm* — Cantor Colburn LLP

(57) ABSTRACT

A portable display terminal according to an exemplary embodiment of the invention includes: a display unit configured to display an image and a mounting unit on which the display unit is mounted. The display unit includes a front display at a front surface of the display unit, and a first lateral display, a second lateral display, a third lateral display and a fourth lateral display at respective side surfaces of the display unit adjacent to the front display. A first image representing a front surface of a displayed object is displayed at the front display, a second image representing a lower side of the displayed object with respect to the first image is displayed at the first lateral display, a third image representing a first lateral side of the displayed object with respect to the first image is displayed at the second lateral display, a fourth image representing an upper side of the displayed image with respect to the first image is displayed at the third lateral display, and a fifth image representing a second lateral side of the displayed image opposite to the first lateral side with respect to the first image is displayed at the fourth lateral display.

12 Claims, 18 Drawing Sheets

(51) Int. Cl.
*G06F 3/0483* (2013.01)
*G06F 3/0485* (2013.01)

(58) Field of Classification Search
USPC ........................................ 345/1.1, 173, 156
See application file for complete search history.

(56) References Cited

U.S. PATENT DOCUMENTS

| | | | |
|---|---|---|---|
| 8,194,043 | B2 | 6/2012 | Cheon et al. |
| 8,947,376 | B2* | 2/2015 | Sirpal ........................... 345/173 |
| 2003/0184525 | A1* | 10/2003 | Tsai ................... G06F 3/04883 |
| | | | 345/173 |
| 2003/0222833 | A1* | 12/2003 | Nakai ................... G06F 1/1626 |
| | | | 345/1.1 |
| 2009/0019401 | A1 | 1/2009 | Park et al. |
| 2009/0280861 | A1* | 11/2009 | Khan ................... H04B 1/3827 |
| | | | 455/556.1 |
| 2010/0001923 | A1* | 1/2010 | Zilber ..................... A63F 13/02 |
| | | | 345/1.1 |
| 2011/0187660 | A1 | 8/2011 | Hirata et al. |
| 2011/0279417 | A1 | 11/2011 | Kang et al. |
| 2012/0084702 | A1 | 4/2012 | Lee et al. |
| 2012/0260217 | A1* | 10/2012 | Celebisoy ........... G06F 3/04815 |
| | | | 715/836 |
| 2012/0306910 | A1 | 12/2012 | Kim et al. |

FOREIGN PATENT DOCUMENTS

| | | |
|---|---|---|
| KR | 1020100042833 A | 4/2010 |
| KR | 1020100104363 A | 9/2010 |
| KR | 1020120132147 A | 12/2012 |
| KR | 1020120134228 A | 12/2012 |
| KR | 1020130068490 A | 6/2013 |
| KR | 10-1292719 B1 | 7/2013 |

* cited by examiner

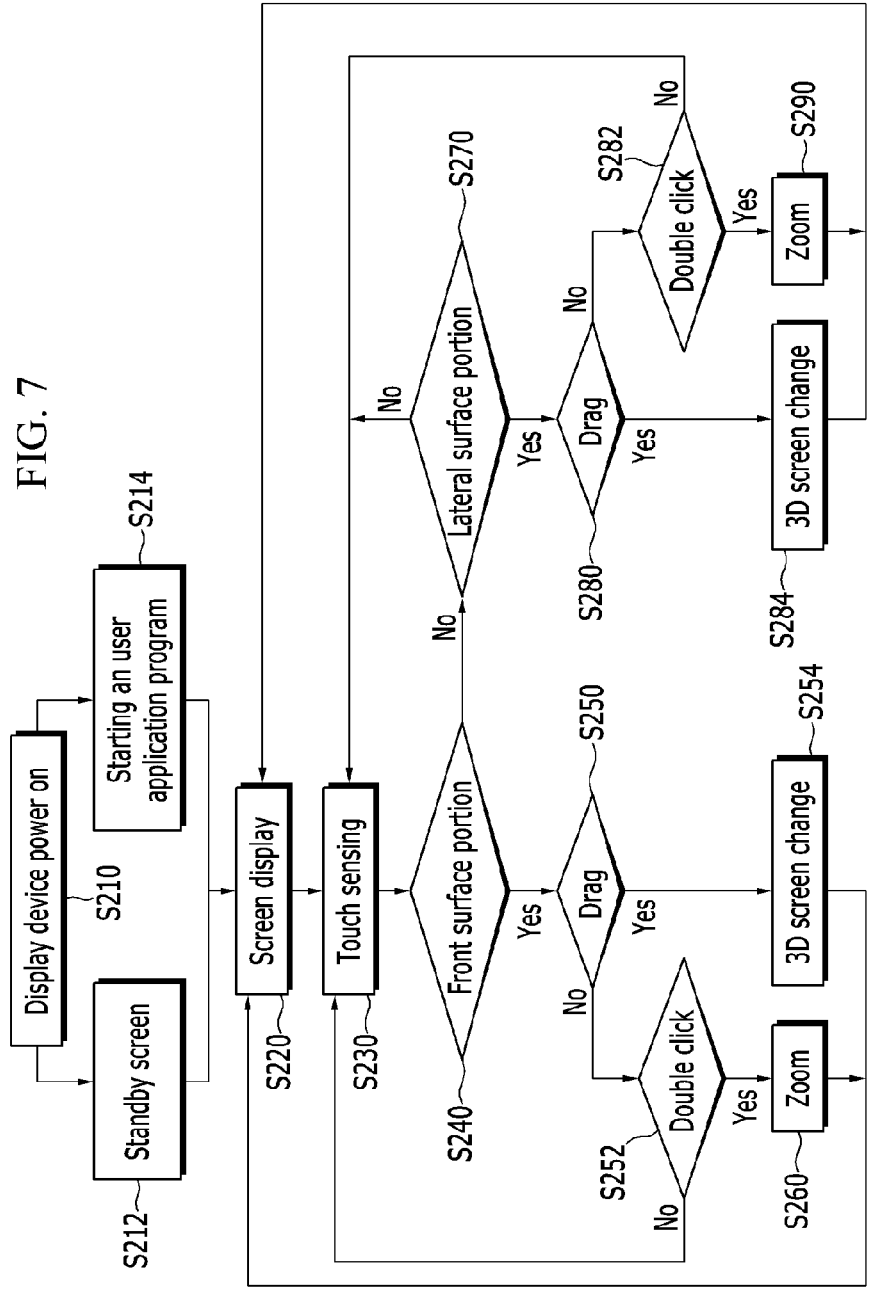

PORTABLE DISPLAY DEVICE AND METHOD OF OPERATING THE SAME

This application claims priority to Korean Patent Application No. 10-2014-0015558 filed on Feb. 11, 2014, and all the benefits accruing therefrom under 35 U.S.C. §119, the entire contents of which are incorporated herein by reference.

BACKGROUND (a) Field

The invention relates to a portable electronic terminal. Particularly, the invention relates to a portable display terminal including a lateral display device.

(b) Description of the Related Art

A wearable display device such as a smart watch has received attention.

For a display device to be wearable, the display device may be easily portable to a user such that a size thereof is very limited.

SUMMARY

Since the size of a wearable display device is limited, a touch input through the display device is limited and accuracy and minute control of such input may be difficult. Also, a display screen of the display device is limited such that the user may use multiple screens and multiple images to view contents or characteristics of an object.

The invention provides a portable electronic terminal including a lateral display.

A portable display terminal according to an exemplary embodiment of the invention includes: a display unit configured to display an image and a mounting unit on which the display unit is mounted. The display unit includes a front display at a front surface of the display unit, and a first lateral display, a second lateral display, a third lateral display and a fourth lateral display at respective side surfaces of the display unit adjacent to the front display. A first image representing a front surface of a displayed object is displayed at the front display, a second image representing a lower side of the displayed object with respect to the first image is displayed at the first lateral display, a third image representing a first lateral side of the displayed object with respect to the first image is displayed at the second lateral display, a fourth image representing an upper side of the displayed image with respect to the first image is displayed at the third lateral display, and a fifth image representing a second lateral side of the displayed image opposite to the first lateral side with respect to the first image is displayed at the fourth lateral display.

The front display, the first lateral display, the second lateral display, the third display and the fourth display may respectively include a display panel and a touch sensing layer.

The front display, the first lateral display, the second lateral display, the third display, and the fourth display may be portions of one single flexible display device.

The front display, the first lateral display, the second lateral display, the third display, and the fourth display may respectively be separate display devices.

At least two displays among the first lateral display, the second lateral display, the third display, the fourth display, and the front display may be portions of one single flexible display device.

The display unit may further include a supporter configured to maintain a shape of the display unit, and a controller configured to control the front display, the first lateral display, the second lateral display, the third display and the fourth display.

The first lateral display and the third lateral display may face each other, and the second lateral display and the fourth lateral display may face each other.

An image drag executed on the front display of the display unit, in a plane of the front display, from left to right, may move the first image from the front display to the second lateral display, and may move the fifth image from the fourth lateral display to the front display.

The image drag executed on the front display, in the plane of the front display, from left to right, may rotate the second image and the fourth image by 90 degrees from left to right in planes of the first lateral display and the third lateral display, respectively.

An image drag executed on the second lateral display of the display unit, in a plane of the second lateral display, from top to bottom, may move the second image, the third image, the fourth image and the fifth image from the first, second, third and fourth lateral displays to the fourth lateral display, the first lateral display, the second lateral display, and the third lateral display, respectively.

The image drag executed on the second lateral display, in the plane of the second lateral display, from top to bottom, may rotate the first image by 90 degrees from top to bottom in a plane of the front display.

An image drag executed on the front display of the display unit, in a plane of the front display, from left to right, may move the first image, the second image, the third image, the fourth image and the fifth image by a predetermined angle from left to right in planes of the front display, the first lateral display, the second lateral display, the third lateral display and the fourth lateral display, respectively.

An image drag executed on the front display, in the plane of the front display, from top to bottom, may move the first image, the second image, the third image, the fourth image and the fifth image by a predetermined angle from top to bottom in the planes of the front display, the first lateral display, the second lateral display, the third lateral display and the fourth lateral display, respectively.

As described above, in one or more exemplary embodiment of the invention, by disposing the front display at the front surface of the display unit and by disposing the first to fourth lateral displays at the lateral surfaces of the display unit, contents of the object displayed by the display unit may be increased and the touch input to control the image may be simplified.

BRIEF DESCRIPTION OF THE DRAWINGS

The above and other advantages and features of this disclosure will become more apparent be describing in further detail exemplary embodiments thereof with reference to the accompanying drawings, in which:

FIG. 7 is a flowchart illustrating a process flow according to the operation of the portable display terminal of FIG. 6A to FIG. 6E.

DETAILED DESCRIPTION

Figure 1:
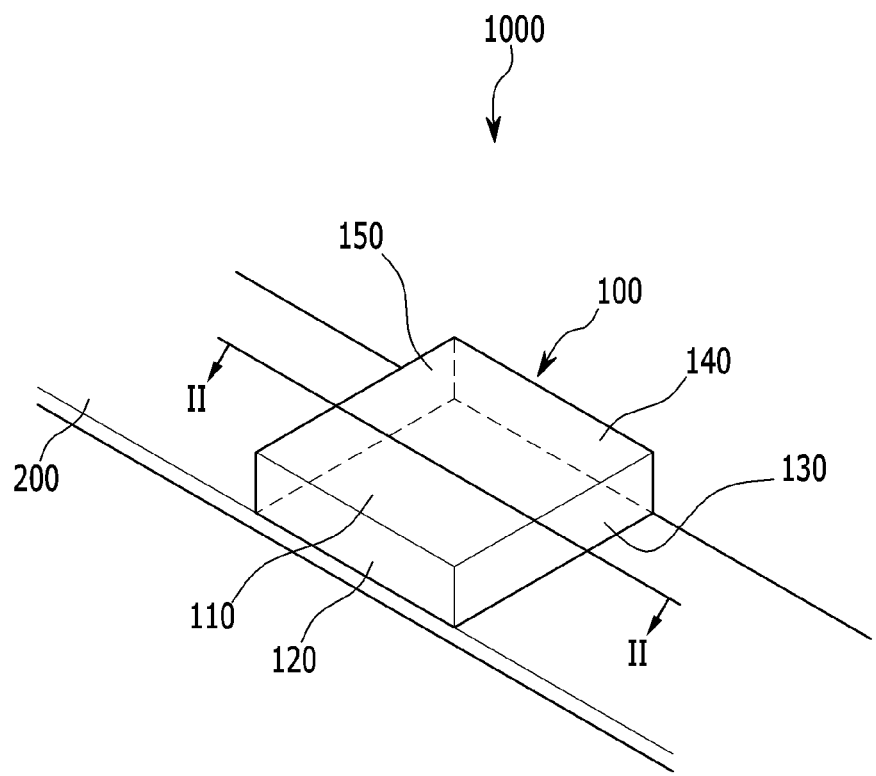
FIG. 1 is a schematic perspective view of an exemplary embodiment of a portable display terminal according to the invention.

Exemplary embodiments of the invention will be described in detail with reference to the attached drawings. The invention may be modified in many different forms and should not be construed as being limited to the exemplary embodiments set forth herein. Rather, the exemplary embodiments of the invention are provided so that this disclosure will be thorough and complete, and will fully convey the concept of the invention to those skilled in the art.

In the drawings, the thickness of layers and regions may be exaggerated for clarity. In addition, when a layer is described to be on another layer or on a substrate, this means that the layer may be on the other layer or on the substrate, or a third layer may be interposed between the layer and the other layer or the substrate. Like numbers refer to like elements throughout the specification. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
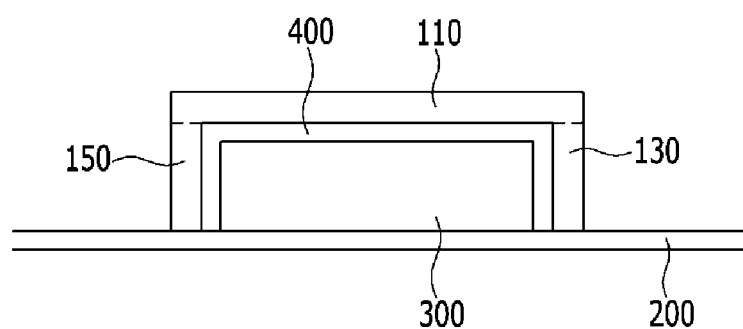
FIG. 2 is a cross-sectional view taken along line II-II of FIG. 1.

FIG. 1 is a schematic perspective view of an exemplary embodiment of a portable display terminal according to the invention. FIG. 2 is a cross-sectional view taken along line II-II of FIG. 1.

Referring to FIG. 1 and FIG. 2, a portable display terminal 1000 includes a display unit 100 configured to display an image, and a mounting unit 200 upon which the display unit 100 is mounted. The mounting unit 200 includes a band and/or other fastening devices so as to mount the display unit 100 to a user such as a wrist or other positions.

The display unit 100 includes a front display 110, a first lateral display 120, a second lateral display 130, a third lateral display 140 and a fourth lateral display 150 each configured to display an image or a portion of a single image. Also, the display unit 100 includes a supporter 300 which is configured to maintain a shape of the display unit 100, and a controller 400 which is configured to control the front display 110, the first lateral display 120, the second lateral display 130, the third lateral display 140 and the fourth lateral display 150.

The front display 110 is disposed at a front surface of the display unit 100, and the first lateral display 120, the second lateral display 130, the third lateral display 140 and the fourth lateral display 150 are disposed at lateral surfaces of the display unit 100. A rear surface of the display unit 100 may face the mounting unit 200 and be opposite to the front surface. Here, the first lateral display 120 and the third lateral display 140 face each other, and the second lateral display 130 and the fourth lateral display 150 face each other.

In an exemplary embodiment, the front display 110, the first lateral display 120, the second lateral display 130, the third lateral display 140 and the fourth lateral display 150 may be portions of one single flexible display device. That is, for the single flexible display device, the first lateral display 120, the second lateral display 130, the third lateral display 140 and the fourth lateral display 150 may be portions of a structure thereof that is respectively bent at four sides of the front display 110.

Also, in an exemplary embodiment, the front display 110, the first lateral display 120, the second lateral display 130, the third lateral display 140 and the fourth lateral display 150 may respectively be different separate display devices.

In an exemplary embodiment, the front display 110, the first lateral display 120 and the third lateral display 140 may be portions of one single flexible display device, and the second lateral display 130 and the fourth lateral display 150 may respectively be separate display devices or portions of another single flexible display device.

Further, in an exemplary embodiment, the front display 110, the second lateral display 130 and the fourth lateral display 150 may be portions of one single flexible display, and the first lateral display 120 and third lateral display 140 may respectively be portions of one single separate display device or may each respectively be a separate display device.

The front display 110, the first lateral display 120, the second lateral display 130, the third lateral display 140 and the fourth lateral display 150 may each respectively include a display panel configured to display an image, a touch sensing layer configured to affect writing or drawing of a character or a picture for display such as by contacting a finger or a touch pen (or stylus) thereto or affect an operation of the display unit 100 such as by executing an icon when the finger or a touch pen (or stylus) is contacted corresponding to the icon, and a window configured to protect the display panel and the touch sensing layer. Here, in an exemplary embodiment, the display panel may be a liquid crystal panel including a liquid crystal layer or an organic light emitting panel including an organic light emitting diode. The touch sensing layer may be disposed on the display panel within a single panel structure or may be disposed as a separate panel which is coupled to the display panel.

The front display 110, the first lateral display 120, the second lateral display 130, the third lateral display 140 and the fourth lateral display 150 are respectively coupled, such as by adhering, to the supporter 300.

The supporter 300 includes a plastic or a metal, or a relatively rigid material, to thereby be configured to maintain the shape of the display unit 100.

The controller 400 includes a touch control device and/or a display control device. A number of touch control devices and display control devices may be proportional to a number of displays within the display unit 100 and configured to display the image. Referring to FIG. 1, for example, there are five displays which display the image, including the front display 110, the first lateral display 120, the second lateral display 130, the third lateral display 140 and the fourth lateral display 150, and there are five touch control devices and five display control devices respectively corresponding to the five displays 110, 120, 130, 140 and 150. Also, the controller 400 may further include a communication module (not shown) configured for communication with the portable display terminal 1000 and/or a battery.

Next, an operation of the portable display terminal of FIG. 1 will be described with reference to FIG. 3 to FIG. 9.

Figure 3A:
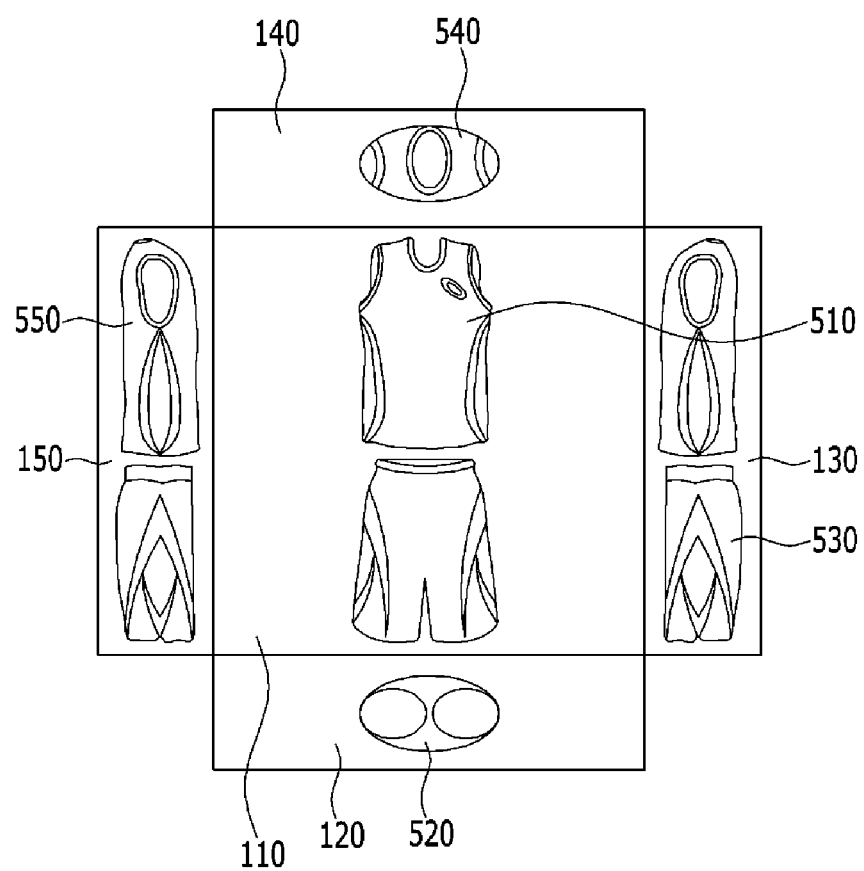
FIG. 3A to FIG. 3C are schematic views showing an exemplary embodiment of an operation of a portable display terminal according to the invention.
Figure 3B:
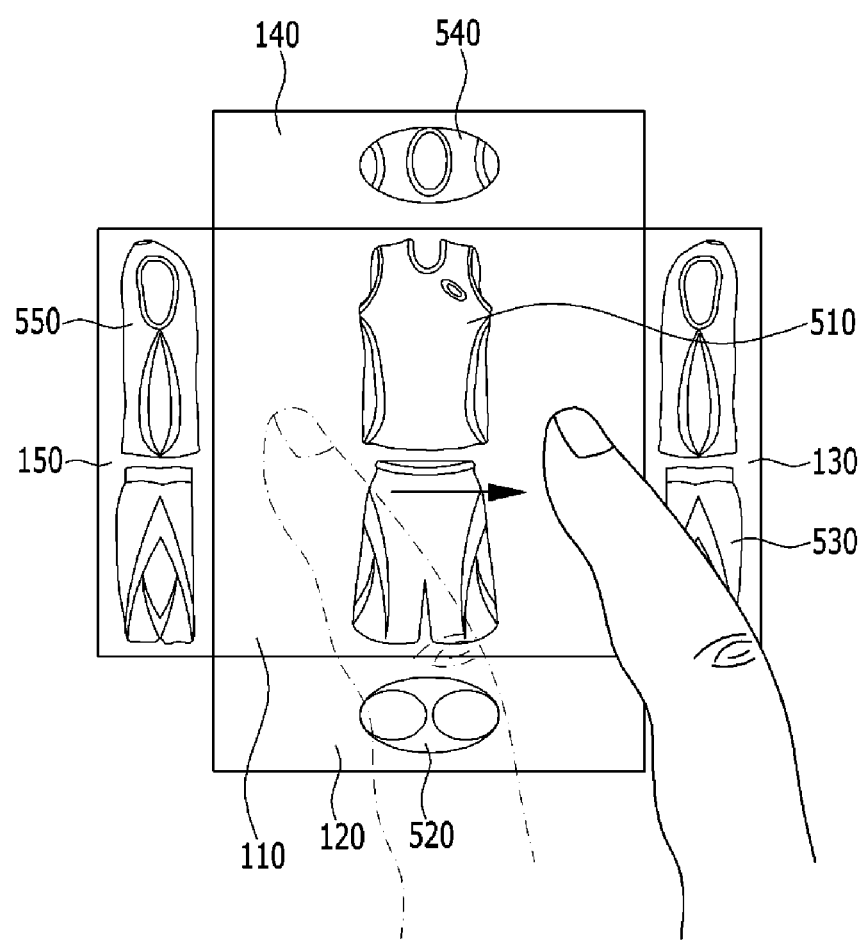
Figure 3C:
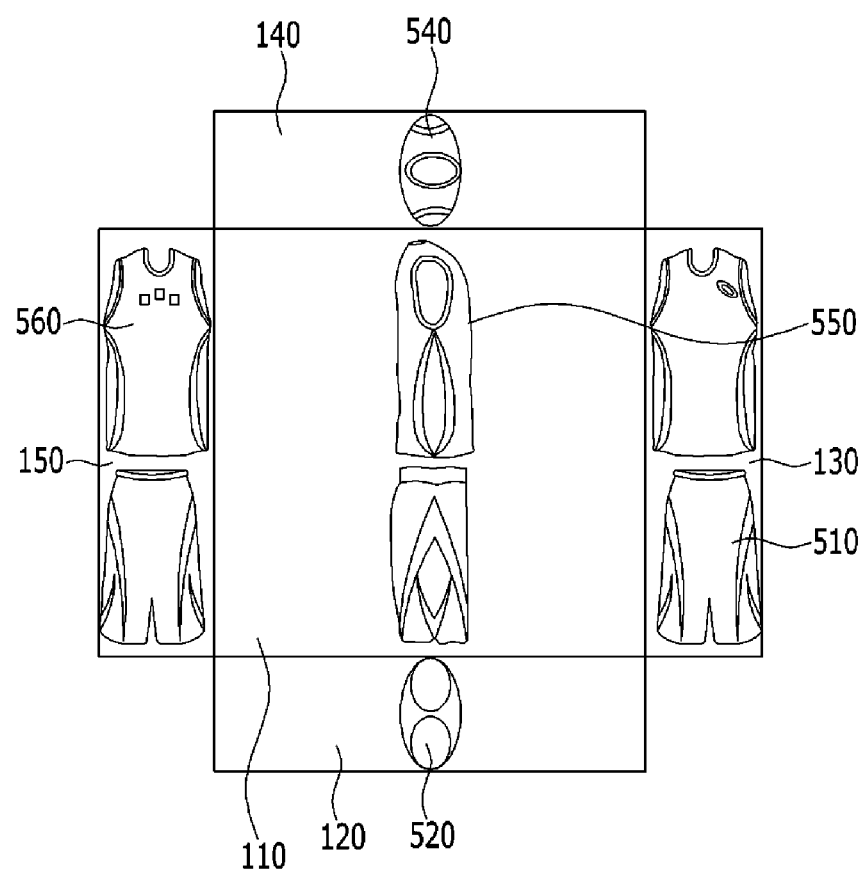

FIG. 3A to FIG. 3C are schematic views showing an exemplary embodiment of an operation of a portable display terminal according to the invention.

In FIG. 3A to FIG. 3C, for convenience of description and explanation, the first lateral display 120, the second lateral display 130, the third lateral display 140 and the fourth lateral display 150 are shown in a (top or viewing side) plane view.

Referring to FIG. 3A, as a reference display configuration, a first screen image 510, a second screen image 520, a third screen image 530, a fourth screen image 540 and a fifth screen image 550 are respectively displayed at the front display 110, the first lateral display 120, the second lateral display 130, the third lateral display 140 and the fourth lateral display 150.

The first screen image 510 is a view representing a front surface of a displayed object, and the second screen image 520 is a view representing a lower side of the object when viewing the first screen image 510 from a lower side thereof. The third screen image 530 is a view representing a first lateral side of the object when viewing the first screen image 510 at a first lateral side thereof, the fourth screen image 540 is a view representing an upper side of the object when viewing the first screen image 510 from an upper side thereof, and the fifth screen image 550 is a view representing a second lateral side of the object opposite to the first lateral side when viewing the first screen image 510 from a second lateral side thereof.

Referring to FIG. 3B, dragging of the displayed image from the front display 110 is affected. Here, the dragging is performed from a left position (dotted line finger) to a right position (solid line finger), on the plane, as indicated by the arrow. A beginning and ending position of the touch are both indicated on the front display 110 to affect the dragging. However, a beginning position may be on the front display 110 while an ending position may extend past an edge of the front display in the direction of the arrow, to affect the dragging.

Referring FIG. 3C, if the image displayed on the front display 110 of FIG. 3A is dragged from left to right on the plane, the fifth screen image 550 is displayed at the front display 110, and the first screen image 510 is displayed at the second lateral display 130. Also, a rear surface image 560 of the displayed object is displayed at the fourth lateral display 150. As the rear surface image 560 was not viewable in the display configuration illustrated in FIG. 3A, the third screen image 530 is not viewable in the display configuration illustrated in FIG. 3C. That is, as dragging of the displayed image on the front display 110 is affected from left to right on the plane, the images displayed at the fourth lateral display 150 and the front display 110 are respectively moved from left to right in the plane view. With respect to the cross-sectional view of FIG. 2, for example, the screen images move in a clockwise direction.

Also, the second screen image 520 and the fourth screen image 540 respectively displayed at the first lateral display 120 and the third lateral display 140 in FIG. 3A, are respectively rotated and displayed at a predetermined angle according to the fifth screen image 550 displayed at the front display 110. In the illustrated exemplary embodiment, the second screen image 520 and the fourth screen image 540 are rotated by 90 degrees on the plane and displayed at the same first lateral display 120 and the third lateral display 140.

Figure 4A:
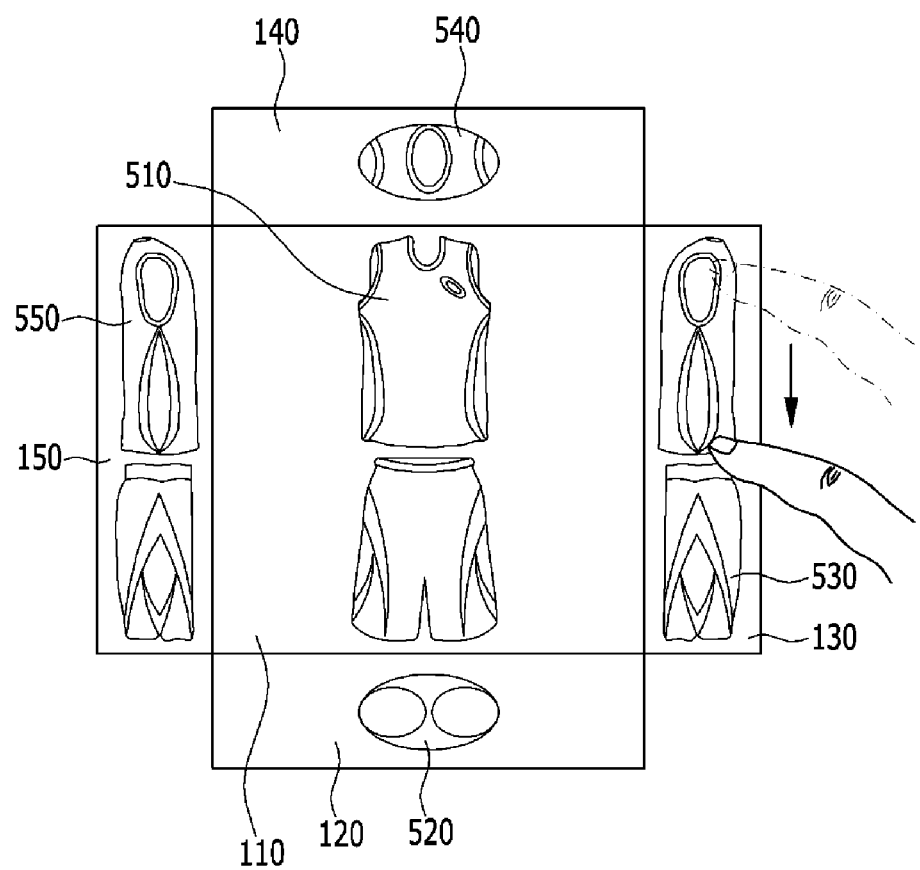
FIG. 4A and FIG. 4B are schematic views showing another exemplary embodiment of an operation of a portable display terminal according to the invention.
Figure 4B:
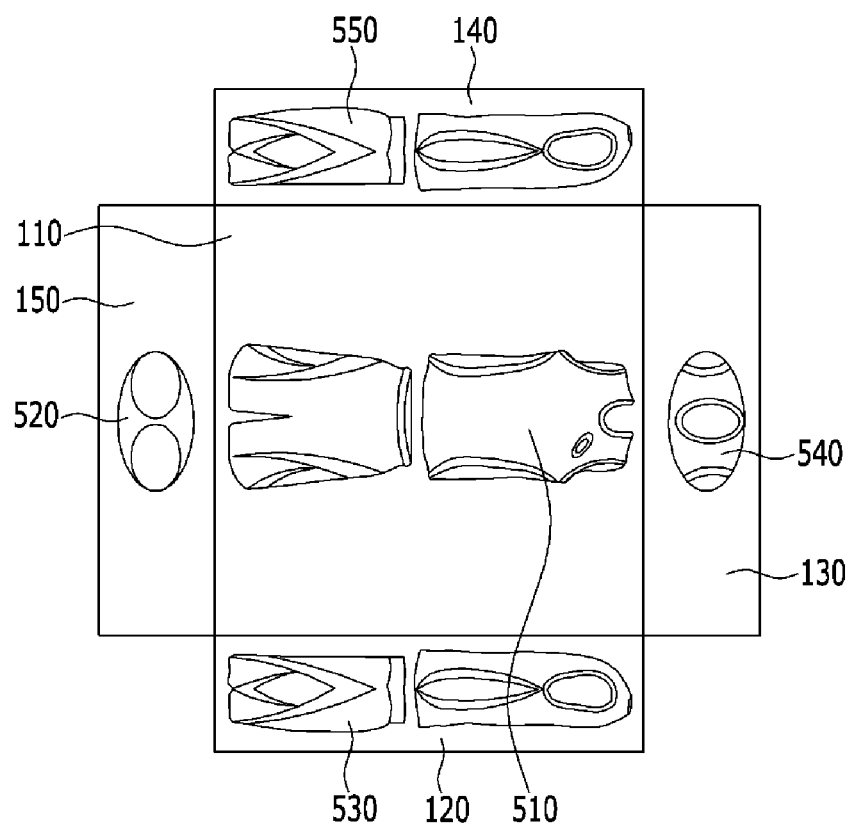

FIG. 4A and FIG. 4B are schematic views showing another exemplary embodiment of an operation of a portable display terminal according to the invention.

In FIG. 4A and FIG. 4B, for convenience in description and explanation, the first lateral display 120, the second lateral display 130, the third lateral display 140 and the fourth lateral display 150 are shown in a (top or viewing side) plane view.

As shown in FIG. 3A, as a reference display configuration, the first screen image 510, the second screen image 520, the third screen image 530, the fourth screen image 540, and fifth screen image 550 are respectively displayed at the front display 110, the first lateral display 120, the second lateral display 130, the third lateral display 140 and the fourth lateral display 150.

Next, as shown in FIG. 4A, dragging of the displayed image from the second lateral display 130 is affected. Here, the dragging is performed from a top position (dotted line finger) to a bottom position (solid line finger) on the plane, as indicated by the arrow. A beginning and ending position of the touch are both indicated on the lateral display to affect the dragging. However, a beginning position may be on the lateral display while an ending position may extend past an edge of the lateral display in the direction of the arrow, to affect the dragging.

Referring to FIG. 4B, if the image displayed on the second lateral display 130 is dragged from top to bottom on the plane, the third screen image 530 is displayed at the first lateral display 120 and the fourth screen image 540 is displayed at the second lateral display 130. Also, the fifth screen image 550 is displayed at the third lateral display 140 and the second screen image 520 is displayed at the fourth lateral display 150. That is, as the image displayed on the second lateral display 130 in the reference configuration of FIG. 3A is dragged from top to bottom on the plane, the second screen image 520, the third screen image 530, the fourth screen image 540 and the fifth screen image 550 are moved in a clockwise direction with respect to the front display 110 and are respectively displayed at the fourth lateral display 150, the first lateral display 120, the second lateral display 130 and the third lateral display 140.

Also, the first screen image 510 displayed at the front display 110 is rotated by a predetermined angle and displayed according to the movement of the second screen image 520, the third screen image 530, the fourth screen image 540 and the fifth screen image 550. In the exemplary embodiment, the first screen image 510 is rotated clockwise on the plane by 90 degrees and displayed at the same front display 110.

Next, a process flow according to the operation of the portable display terminal of FIG. 3A to FIG. 3C and FIG. 4A and FIG. 4B will be described with reference to FIG. 5.

Figure 5:
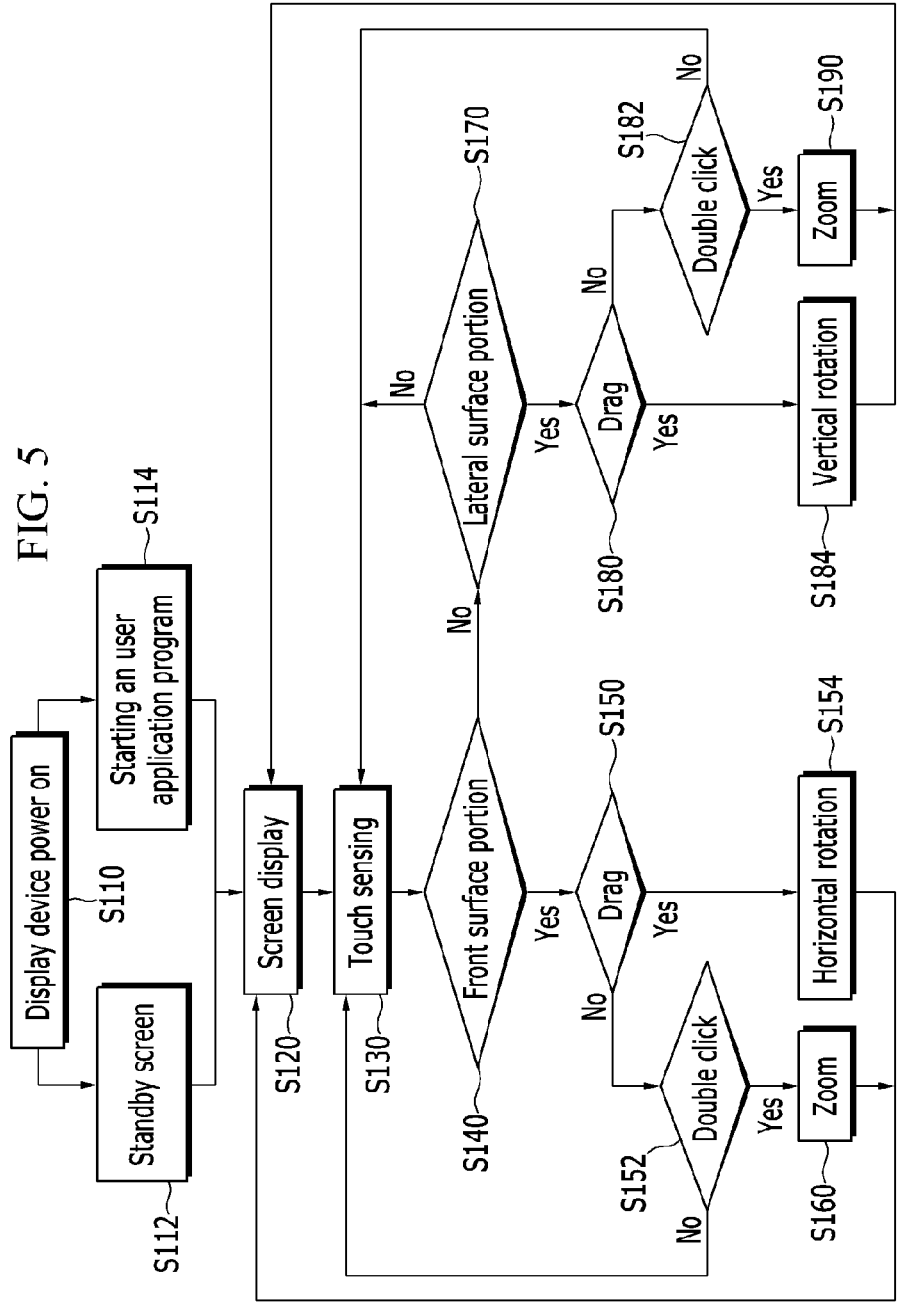
FIG. 5 is a flowchart illustrating a process flow according to the operation of the portable display terminal of FIG. 3A to FIG. 3C and FIG. 4A and FIG. 4B.

FIG. 5 is a flowchart illustrating a process flow according to the operation of the portable display terminal of FIG. 3A to FIG. 3C FIG. 4A and FIG. 4B.

The display device of the portable display terminal is turned on (S110). With or by the turning on of the display device, a standby screen (S112) and/or a specific application of the user (S114) is executed.

Next, images are respectively displayed (S120) at each display of the display unit of the portable display terminal (refer to FIG. 3A).

Next, the touch input by the user is sensed (S130). Here, a region where the touch is input is determined and a shape of the touch is distinguished. The 'shape' of the touch may define a movement direction of the touch with respect to the plane illustrated in FIG. 3A such as by input of more than one touch location so as to define the movement direction of the touch with respect to the plane illustrated in FIG. 3A.

As shown in FIG. 3B, if the drag that is executed from left to right on the plane at the front display is determined in response to a left to right movement direction of the touch at the front display (S140), the images displayed at the fourth lateral display and the front display are moved from left to right (S150). That is, the images are horizontally translated with respect to the plane illustrated in FIG. 3A or clockwise rotated with respect to the cross-sectional view in FIG. 2 (S154).

Also, in an exemplary embodiment, when the touch input is determined as a double click (e.g., more than one contact at a substantially same position) at the front display (S152), the image displayed at the front display is enlarged or magnified (e.g., zoomed) (S160).

As shown in FIG. 4A, if the drag that is executed from top to bottom on the plane at the lateral display is determined in response to a left to right movement direction of the touch at the lateral display (S170), the images displayed at each lateral display are respectively rotated in the clockwise direction with respect to the plane illustrated in FIG. 3A (S180). Here, there may be no clockwise rotation with respect to the cross-sectional view in FIG. 2. That is, the images displayed on the lateral displays are vertically translated and rotated in the plane view with respect to the front display (S184).

Also, in an exemplary embodiment, when the touch input is determined as the double click at the lateral display (S182), the image displayed at the lateral display is zoomed (S190).

While the viewpoints at the displays 110 through 150 correspond to a same single object, the invention is not limited thereto. In an alternative exemplary embodiment, for example, a viewpoint of a first object may be displayed on the front display 110 and additional viewpoints of the same first object may be displayed on a group of less than all of the lateral displays 120 through 150, while viewpoints of a different second object may be displayed by one or more of the remaining lateral displays.

FIG. 6A to FIG. 6E are schematic views showing still another exemplary embodiment of an operation of a portable display terminal according to the invention.

In FIG. 6A to FIG. 6E, for convenience of description and explanation, the first lateral display 120, the second lateral display 130, the third lateral display 140 and the fourth lateral display 150 are shown in the plane view.

Figure 6A:
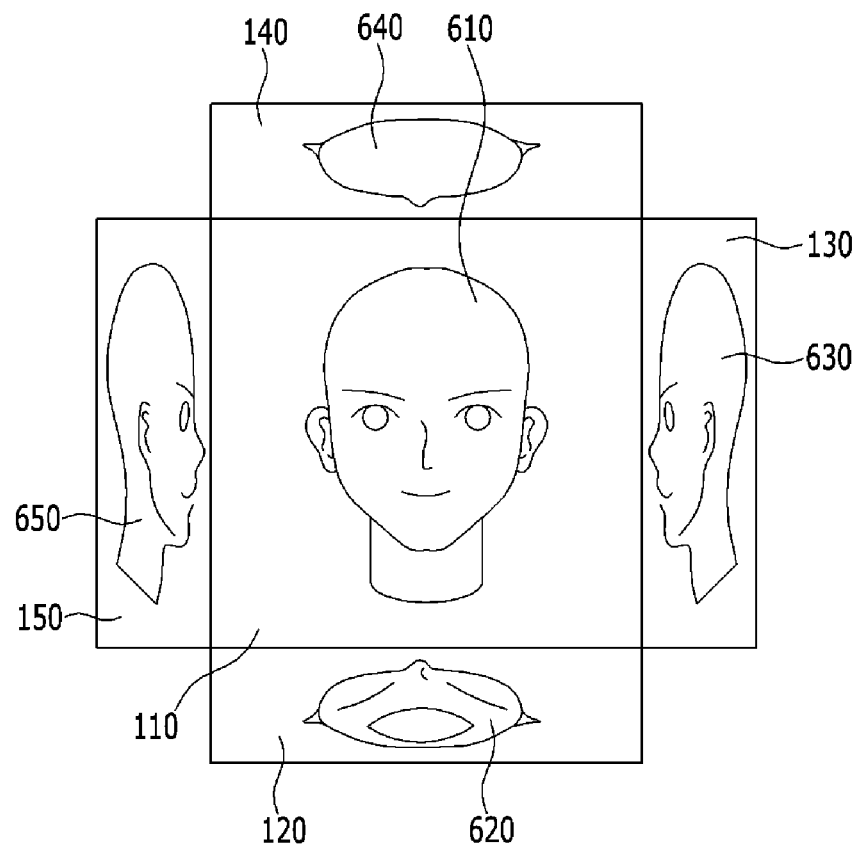
FIG. 6A to FIG. 6E are schematic views showing still another exemplary embodiment of an operation of a portable display terminal according to the invention.

Referring to FIG. 6A, as a reference display configuration, a sixth screen image 610, a seventh screen image 620, an eighth screen image 630, a ninth screen image 640 and a tenth screen image 650 are respectively displayed at the front display 110, the first lateral display 120, the second lateral display 130, the third lateral display 140 and the fourth lateral display 150.

The sixth screen image 610 is the view representing the front surface of a displayed object, and the seventh screen image 620 is a view representing a lower side of the object when viewing the sixth screen image 610 from a lower side thereof. The eighth screen image 630 is a screen representing a first lateral side of the object when viewing the sixth screen image 610 from a first lateral side thereof, the ninth screen image 640 is a view representing an upper side of the object when viewing the sixth screen image 610 from an upper side thereof, and the tenth screen image 650 is a view representing a second lateral side of the object opposite to the first lateral side when viewing the sixth screen image 610 from a second lateral side thereof.

Figure 6B:
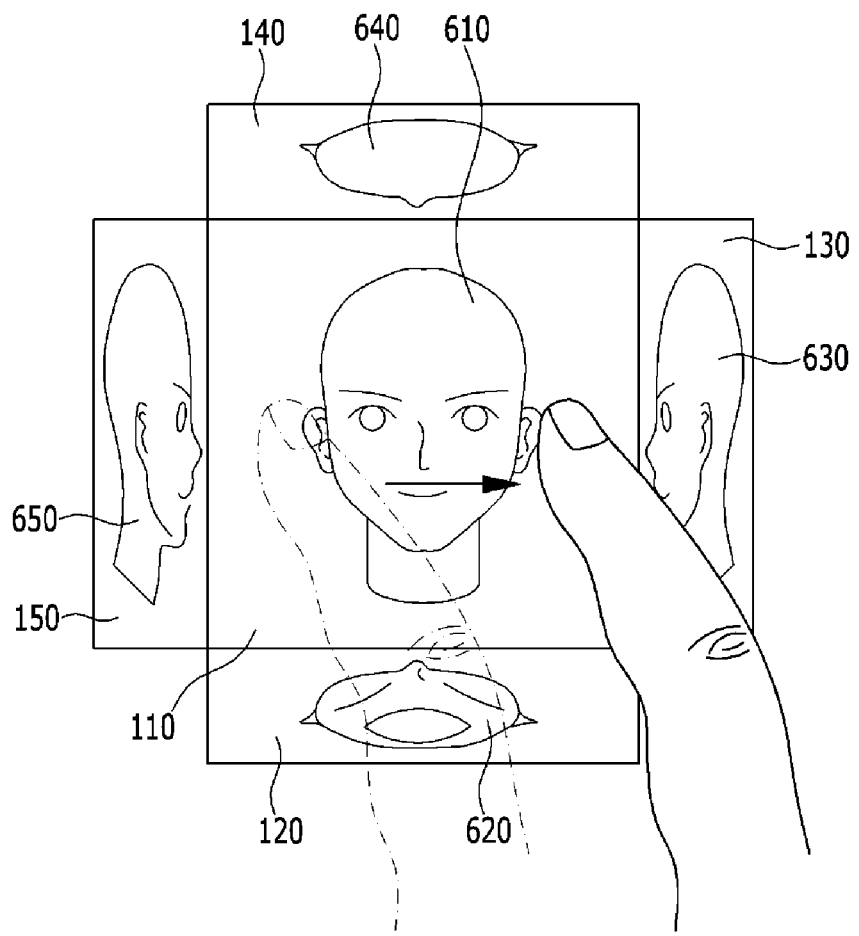

Referring to FIG. 6B, dragging of the displayed image on the front display 110 is affected. Here, the dragging is performed from left to right on the plane, as indicated by the arrow. A beginning and ending position are both indicated on the front display 110 to affect the dragging. However, a beginning position may be on the front display 110 while an ending position may extend past an edge of the front display in the direction of the arrow, to affect the dragging.

Figure 6C:
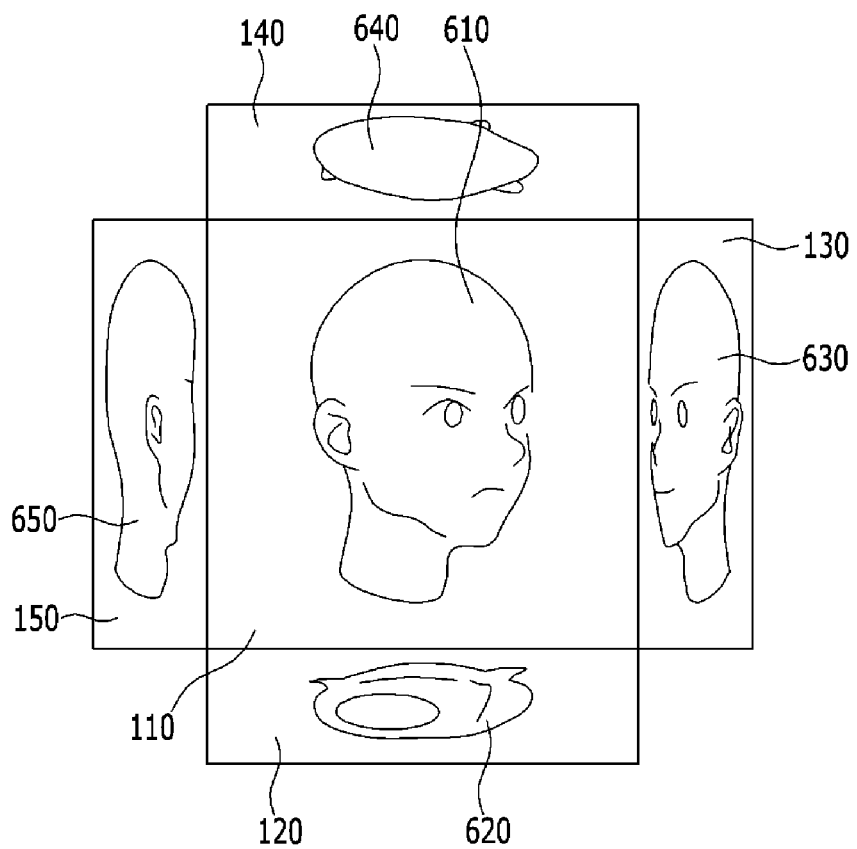

Referring to FIG. 6C, if the image displayed on the front display 110 is dragged from left to right on the plane, the sixth screen image 610 displayed at the front display 110 is moved from left to right on the plane by a predetermined angle according to the drag degree, and displayed at the same front display 110. That is, the viewing point of the sixth screen image 610 displayed at the front display 110 is changed. The seventh screen image 620, the eighth screen image 630, the ninth screen image 640 and the tenth screen image 650 respectively displayed at the first lateral display 120, the second lateral display 130, the third lateral display 140 and the fourth lateral display 150 are also moved by the predetermined angle from left to right on the plane according to the change of the viewing point of the sixth screen image 610, and respectively displayed at the same first through fourth lateral displays 120, 130, 140 and 150.

Figure 6D:
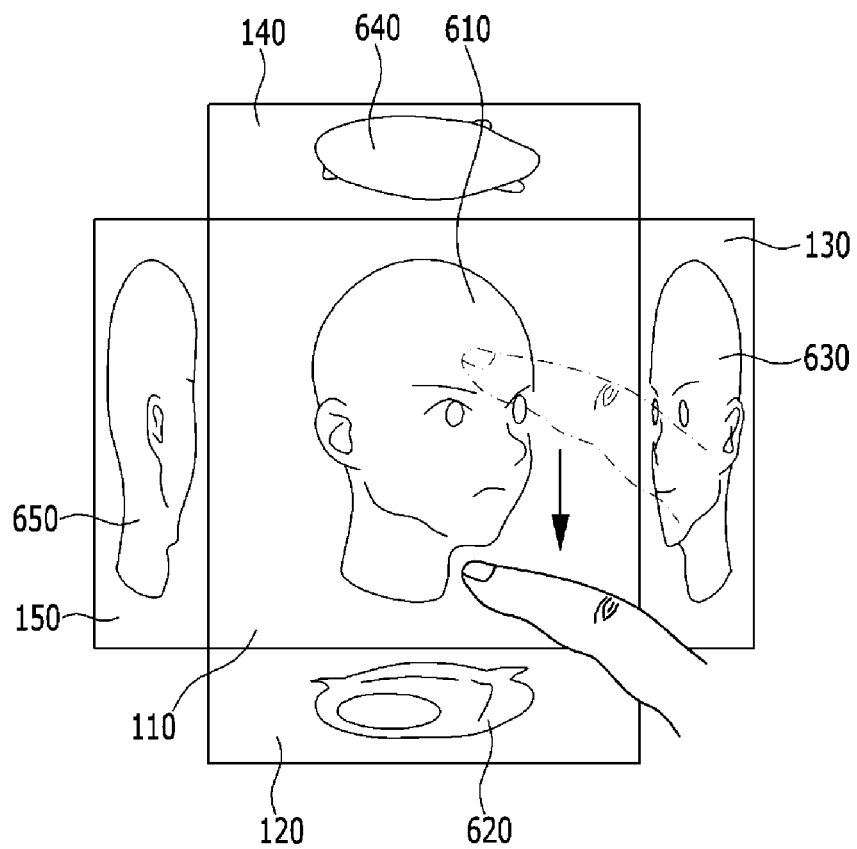

Referring to FIG. 6D, dragging of the displayed image on the front display 110 is affected. Here, the drag is performed from top to bottom on the plane, as indicated by the arrow. A beginning and ending position of the touch are both indicated on the front display 110 to affect the dragging. However, a beginning position may be on the front display 110 while an ending position may extend past an edge of the front display in the direction of the arrow, to affect the dragging.

Figure 6E:
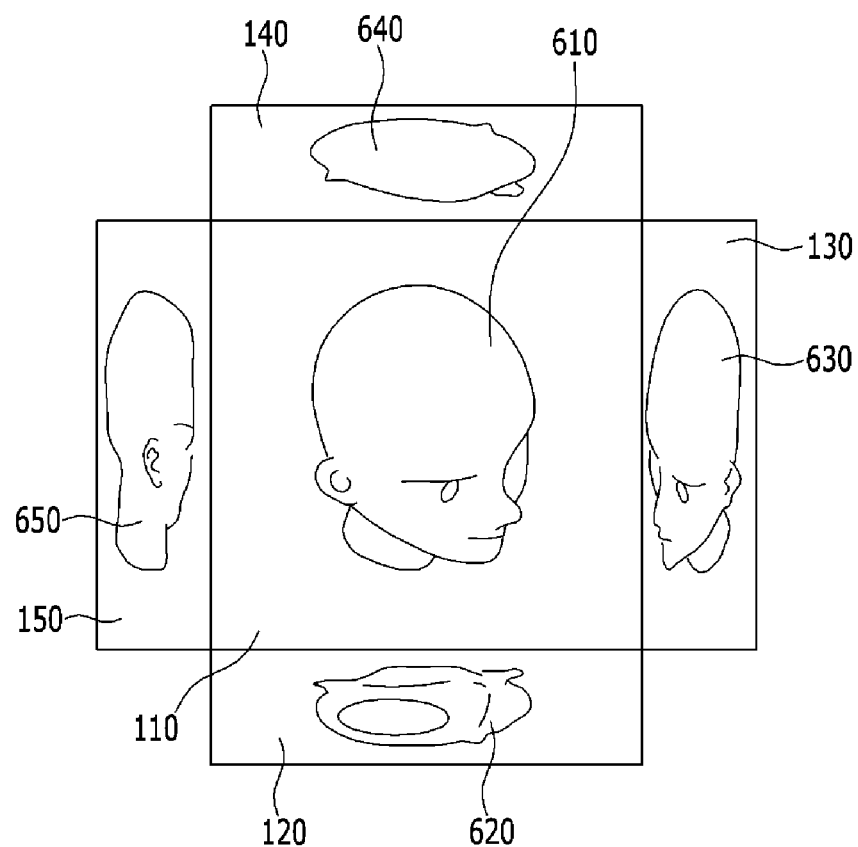

Referring to FIG. 6E, if the image displayed on the front display 110 is dragged on the plane from top to bottom, the sixth screen image 610 displayed at the front display 110 is moved by the predetermined angle from top to bottom on the plane according to the drag degree and displayed at the same front display 110. That is, the viewing point of the sixth screen image 610 displayed at the front display 110 is changed. The seventh screen image 620, the eighth screen image 630, the ninth screen image 640 and the tenth screen image 650 respectively displayed at the first lateral display 120, the second lateral display 130, the third lateral display 140 and the fourth lateral display 150 are moved by the predetermined angle from top to bottom on the plane according to the change of viewpoint of the sixth screen image 610 and displayed at the same first through fourth lateral displays 120, 130, 140 and 150.

Next, a process flow according to the operation of the portable display terminal of FIG. 6A to FIG. 6E will be described with reference to FIG. 7.

FIG. 7 is a flowchart illustrating a process flow according to the operation of the portable display terminal of FIG. 6A to FIG. 6E.

The display device of the portable display terminal is turned on (S210). With or by the turning on of the display device, the standby screen (S212) or the specific application of the user (S214) is executed.

Next, images are respectively displayed (S220) at each display of the display unit of the portable display terminal (refer to FIG. 6A).

Next, the touch input by the user is sensed (S230). Here, the region where the touch is input is determined and the shape thereof is distinguished. The 'shape' of the touch may define a movement direction of the touch with respect to the plane illustrated in FIG. 6A such as by input of more than one touch location so as to define the movement direction of the touch with respect to the plane illustrated in FIG. 6A

As shown in FIG. 6B or FIG. 6D, if the drag that is executed from left to right on the plane or from top to bottom on the plane at the front display is determined in response to a left to right or top to bottom movement direction of the touch at the front display (S240), the viewing point of the images respectively displayed on each display is changed (S250). That is, since the viewing point of all the images is changed with a single drag, the images are three-dimensionally ("3-D") translated with respect to a top-bottom and a left-right virtual axis (S254).

Also, in an exemplary embodiment, when the touch input is determined as the double click at the front display (S252), the image displayed at the front display is zoomed (S260). If the drag that is executed from left to right on the plane or from top to bottom on the plane at the lateral display is determined in response to a left to right or top to bottom movement direction of the touch at a lateral display (S270), the viewing point of the images respectively displayed in each display is changed (S280). That is, since the viewing point of all the images is changed with a single drag, the images are three-dimensionally ("3-D") translated with respect to a top-bottom and a left-right virtual axis (S284).

When the touch input is determined as the double click at the front display (S282), the image displayed at the latter display is zoomed (S290).

As described above, in one or more exemplary embodiment, the front display 110 is disposed at the front surface of the display unit 100, the first to fourth lateral displays 120, 130, 140 and 150 are disposed at the sides of the display unit 100, the touch is input to the displays 110, 120, 130, 140 and 150, and then the image displayed at the displays 110, 120, 130, 140 and 150 may be moved and/or the viewing point thereof may be changed.

Figure 8A:
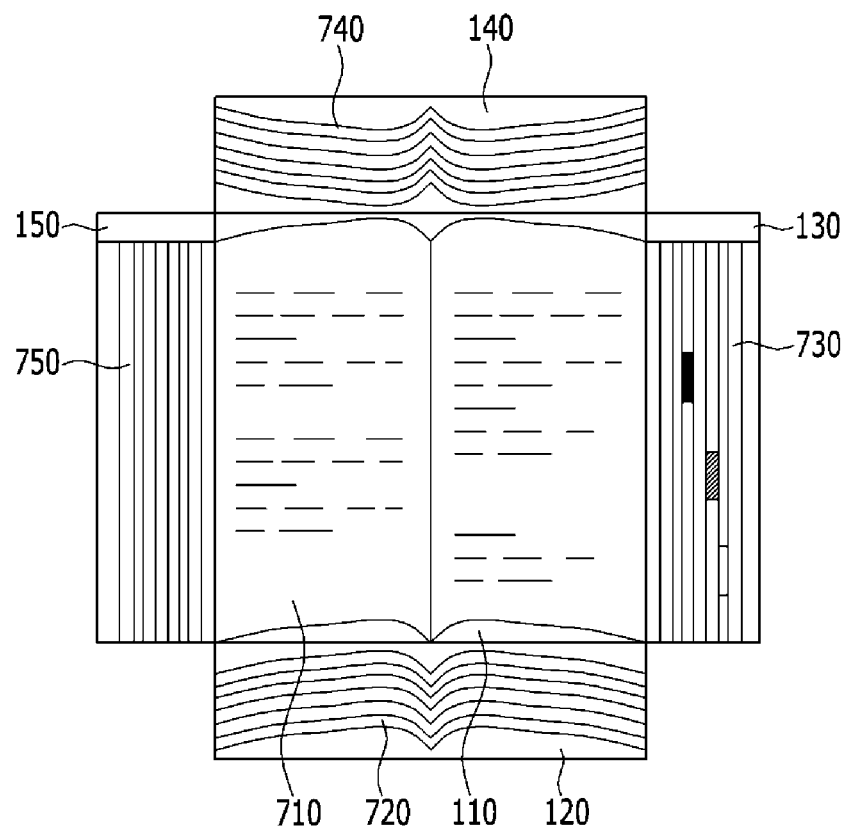
FIG. 8A to FIG. 8C are schematic views showing yet another exemplary embodiment of an operation of a portable display terminal according to the invention.
Figure 8B:
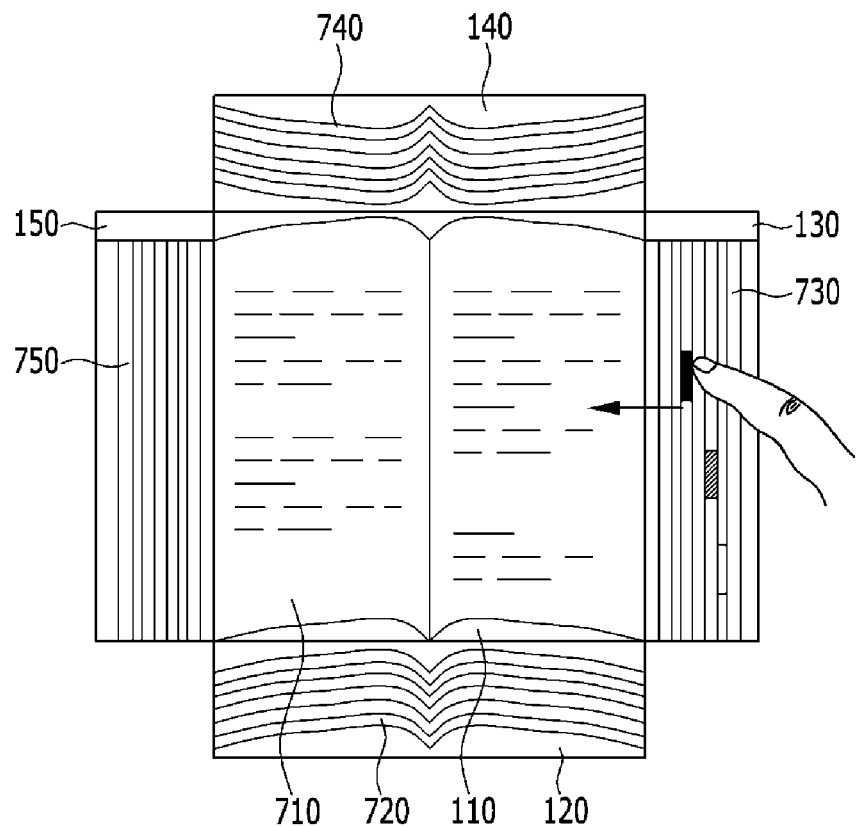
Figure 8C:
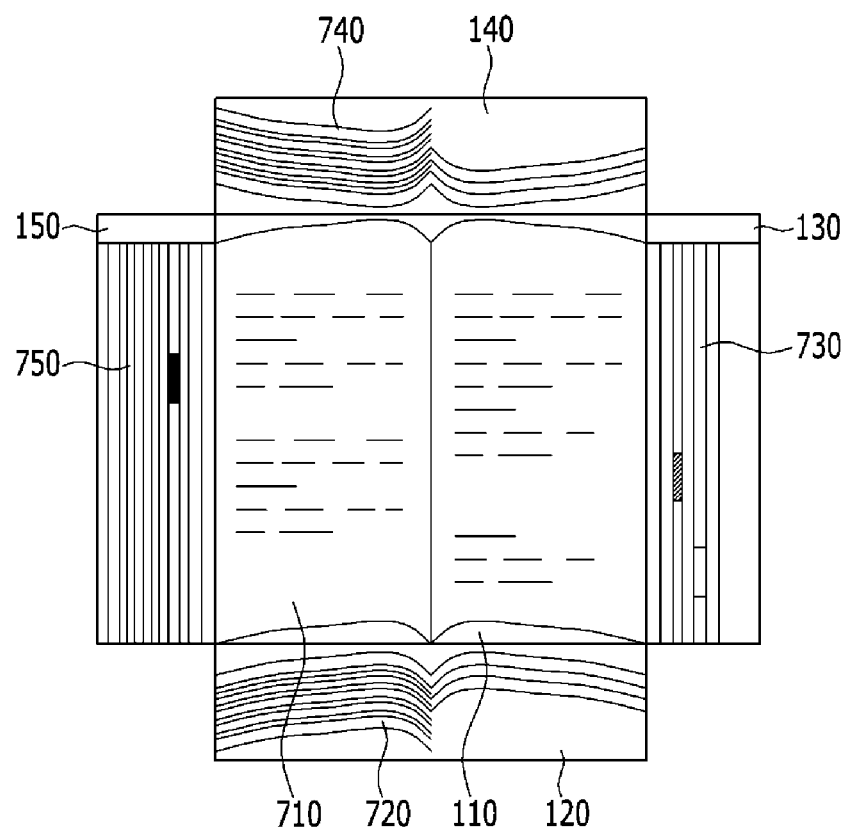

That is, in one or more exemplary embodiment, by displaying viewpoints of a single image on the first to fourth lateral displays 120, 130, 140 and 150 at the lateral surfaces of the display unit 100, as well as displaying a viewpoint on the front display 110 at the front surface of the display unit 100, contents of the image of the object displayed by the display unit 100 may be increased and the touch input to control the image may be simplified. FIG. 8A to FIG. 8C are schematic views showing yet another exemplary embodiment of an operation of a portable display terminal according to the invention.

In FIG. 8A to FIG. 8C, for convenience of description and explanation, the first lateral display 120, the second lateral display 130, the third lateral display 140 and the fourth lateral display 150 are shown in the plane view.

Referring to FIG. 8A, an eleventh screen image 710, a twelfth screen image 720, thirteenth screen image 730, a fourteenth screen image 740, and a fifteenth screen image 750 are respectively displayed at the front display 110, the first lateral display 120, the second lateral display 130, the third lateral display 140 and the fourth lateral display 150. The eleventh screen image 710 is a view representing the front surface of the displayed object, and the twelfth screen image 720 is a view representing a lower side of the object when viewing the eleventh screen image 710 from the lower side thereof. The thirteenth screen image 730 is a view representing a first lateral side of the object when viewing the eleventh screen image 710 from a first lateral side thereof, the fourteenth screen image 740 is a view representing an upper side of the object when viewing the eleventh screen image 710 from an upper side thereof, and the fifteenth screen image 750 is a view representing the a second lateral side of the object opposite to the first lateral side when viewing the eleventh screen image 710 from a second lateral side thereof. Here, the eleventh screen image 710, the twelfth screen image 720, the thirteenth screen image 730, the fourteenth screen image 740, and the fifteenth screen image 750 electronically represent a book. A current (readable) page of the book is represented on the front display 710, while other pages of the book are represented on the lateral displays 120 through 150.

Referring to FIG. 8B, dragging of the displayed image on the second lateral display 130 is affected. Here, the dragging is performed from right to left on the plane, as indicated by the arrow. The touch begins on the lateral display and extends past an edge of the lateral display in the direction of the arrow, to affect the dragging. Alternatively, an ending position of the touch may not extend past the edge of the lateral display, such that both the beginning and ending positions of the touch are on the lateral display.

Referring to FIG. 8C, if the image displayed on the second lateral display 130 is dragged from right to left on the plane, a portion of the image is recognized as a bookmark. A page other than the current page of the book is indicated by the bookmark on the second lateral display 130. When the image displayed on the second lateral display 130 is dragged from right to left on the plane, the eleventh screen image 710 displayed at the front display 110 is changed from the current (readable) page of the book to another page of the book.

As illustrated in FIG. 8C, since another page of the book was exposed and made viewable as the eleventh screen image 710 by the dragging of a portion of the image on the second lateral display 130, less remaining (non-readable) pages of the book are indicated at the second lateral display 130, while more remaining (non-readable) pages of the book are indicated at the fourth lateral display 150. Also, the bookmark indicated by a solid black box has moved from the second lateral display 130 to the fourth lateral display 150.

Next, a process flow according to the operation of the portable display terminal of FIG. 8A to FIG. 8C will be described with reference to FIG. 9.

Figure 9:
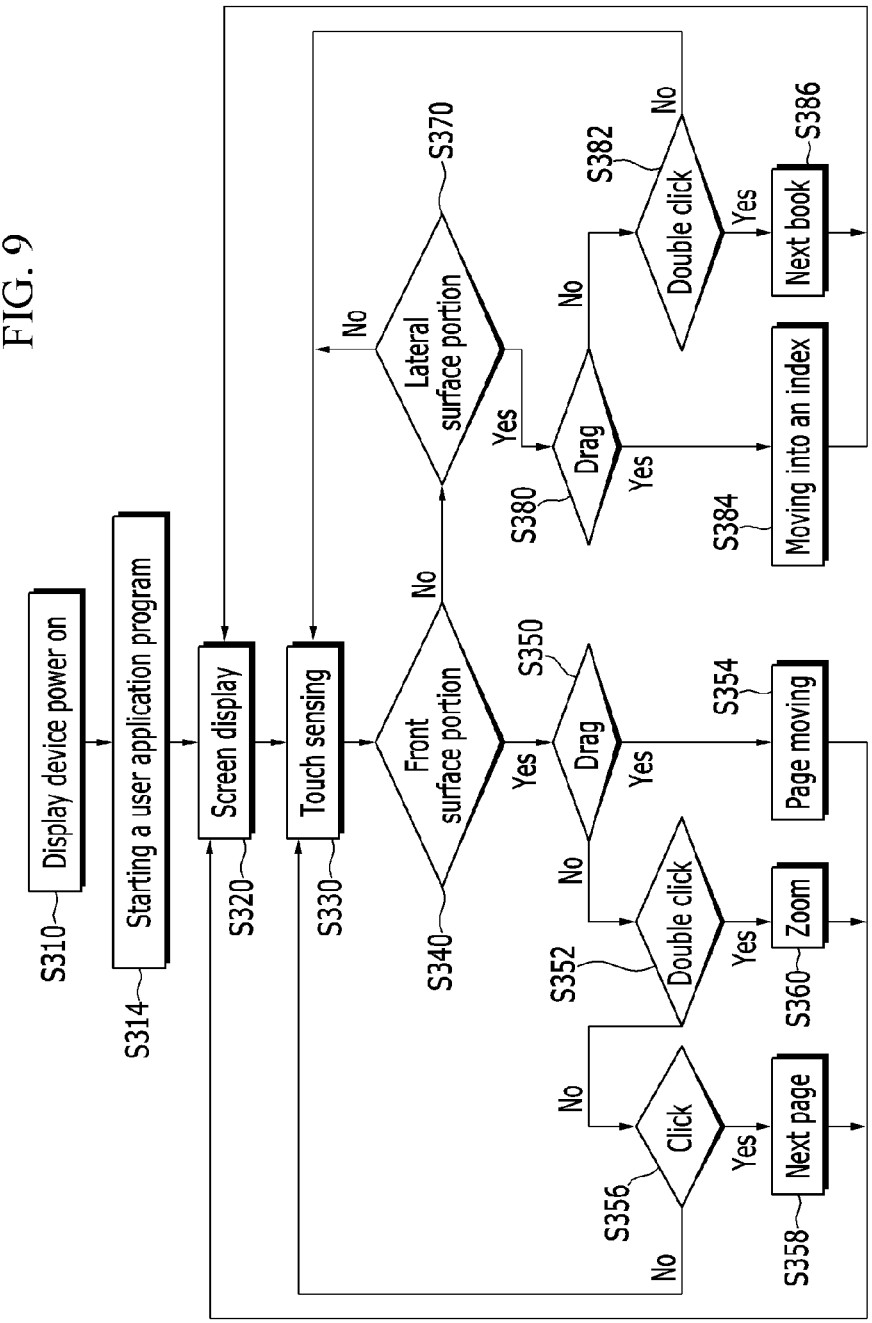
FIG. 9 is a flowchart illustrating a process flow according to the operation of the portable display terminal of FIG. 8A to FIG. 8C.

FIG. 9 is a flowchart illustrating a process flow according to an operation of the portable display terminal of FIG. 8A to FIG. 8C.

The portable display terminal is turned on (S310). With or by the turning on of the display device, the specific application of the user is executed (S314). In the illustrated exemplary embodiment, the specific application affecting viewing of pages of a book is executed.

Next, the screen is respectively displayed (S320) at each display of the display unit of the portable display terminal (refer to FIG. 8A).

Next, the touch input by the user is sensed (S330). Here, the region where the touch is input is determined, and the shape thereof is distinguished. The 'shape' of the touch may define a movement direction of the touch with respect to the plane illustrated in FIG. 8A such as by input of more than one touch location so as to define the movement direction of the touch with respect to the plane illustrated in FIG. 8A.

As shown in FIG. 8B, if the drag is determined at the lateral display (S340 and S370), the portion of the image on the lateral display that is dragged (S380) is recognized as the bookmark. The dragging of the bookmark affects an operation of moving into an index (S384) where the image displayed at the front display is changed from a current page of the book or a non-page image, into another page of the book. Also, when the touch input is determined as the double click (S382), images of a next book other than the current book is displayed at each display (S386).

If the drag is determined at the front display (S340 and S350), the current page displayed at the front display is moved upward, downward, right and left according to the direction of the drag (S354). When the touch input is determined as the double click (S352), the current page displayed at the front display is zoomed (S360). When the touch input is determined as a single click (S356), a next page of the book in readable sequence is displayed at the front display (S358).

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:
1. A portable display terminal comprising:
a display unit defining a plurality of displays which respectively display different images of a same object, comprising:
a front display at a front surface of the display unit, and
a first lateral display, a second lateral display, a third lateral display and a fourth lateral display extended from the front display at respective side surfaces of the display unit; and
a mounting unit on which the display unit is mounted and via which the display unit is coupled to a user of the portable display terminal,
wherein
the mounting unit on which the display unit is mounted opposes the front display of the display unit and is in a different plane than all of the plurality of displays defined by the display unit,
a first image representing a front surface of the object is displayed at the front display which opposes the mounting unit on which the display unit is mounted,
a second image representing a lower side of the object with respect to the first image is displayed at the first lateral display,
a third image representing a first lateral side of the object with respect to the first image is displayed at the second lateral display,
a fourth image representing an upper side of the object with respect to the first image is displayed at the third lateral display,
a fifth image representing a second lateral side of the object opposite to the first lateral side with respect to the first image is displayed at the fourth lateral display,
the first lateral display and the third lateral display of the display unit face each other,
the second lateral display and the fourth lateral display of the display unit face each other,
the front display, the first lateral display, the second lateral display, the third lateral display and the fourth lateral display are in different planes from each other, and
an image drag executed on the front display of the display unit, in a plane of the front display, from left to right, moves the first image from the front display to the second lateral display,
moves the fifth image from the fourth lateral display to the front display, and rotates the second image and the fourth image by 90 degrees from left to right in planes of the first lateral display and the third lateral display, respectively.

2. The portable display terminal of claim 1, wherein the front display, the first lateral display, the second lateral display, the third lateral display and the fourth lateral display respectively include a display panel and a touch sensing layer.

3. The portable display terminal of claim 2, wherein the front display, the first lateral display, the second lateral display, the third lateral display and the fourth lateral display are portions of one single flexible display device.

4. The portable display terminal of claim 2, wherein the front display, the first lateral display, the second lateral display, the third lateral display and the fourth lateral display are respectively separate display devices.

5. The portable display terminal of claim 2, wherein at least two displays among the first lateral display, the second lateral display, the third lateral display, the fourth lateral display and the front display are portions of one single flexible display device.

6. The portable display terminal of claim 1, wherein the display unit further comprises:
 a supporter between the mounting unit and each of the front display, the first lateral display, the second lateral display, the third lateral display and the fourth lateral display, the supporter configured to maintain a shape of the display unit with respect to the mounting unit, and
 a controller configured disposed between the supporter and each of the front display, the first lateral display, the second lateral display, the third lateral display and the fourth lateral display, wherein the controller controls each of the front display, the first lateral display, the second lateral display, the third lateral display and the fourth lateral display.

7. The portable display terminal of claim 1, wherein
an image drag executed on the second lateral display of the display unit, in a plane of the second lateral display, from top to bottom,
 moves the second image, the third image, the fourth image and the fifth image from the first, second, third and fourth lateral displays to the fourth lateral display, the first lateral display, the second lateral display, and the third lateral display, respectively.

8. The portable display terminal of claim 7, wherein the image drag executed on the second lateral display, in the plane of the second lateral display, from top to bottom,
 rotates the first image by 90 degrees from top to bottom in a plane of the front display.

9. A method of operating a portable display terminal, comprising:
 respectively displaying different images of a same object by a plurality of displays defined by a display unit, by displaying:
  a first image representing a front surface of the object at a front display of the portable display terminal,
  a second image representing a lower side of the object with respect to the first image at a first lateral display of the portable display terminal extended from a first side of the front display,
  a third image representing a first lateral side of the object with respect to the first image at a second lateral display of the portable display terminal extended from a second side of the front display,
  a fourth image representing an upper side of the object with respect to the first image at a third lateral display of the portable display terminal extended from a third side of the front display, and
  a fifth image representing a second lateral side of the object opposite to the first lateral side with respect to the first image at a fourth lateral display of the portable display terminal extended from a fourth side of the front display,
 wherein
 the display unit of the portable display terminal defines each of the front display and the first, second, third and fourth lateral displays,
 the front display, the first lateral display, the second lateral display, the third lateral display and the fourth lateral display are in different planes from each other, and
 the display unit is mounted on a mounting unit which opposes the front display of the display unit and is in a different plane than all of the plurality of displays defined by the display unit,
 and
 executing a single image drag on one of the front display, the first lateral display, the second lateral display, the third lateral display and the fourth lateral display of the display unit to move each of the first image, the second image, the third image, the fourth image and the fifth image within the display unit,
 wherein the executing the single image drag on the front display of the display unit, in a plane of the front display, from left to right:
  moves the first image from the front display to the second lateral display,
  moves the fifth image from the fourth lateral display to the front display, and
  rotates the second image and the fourth image by 90 degrees from left to right in planes of the first lateral display and the third lateral display, respectively.

10. The method of claim 9, wherein the front display, the first lateral display, the second lateral display, the third lateral display and the fourth lateral display respectively include a display panel and a touch sensing layer.

11. The method of claim 9,
 further comprising executing the single image drag on the second lateral display of the display unit, in a plane of the second lateral display, from top to bottom, to move the second image, the third image, the fourth image and the fifth image from the first, second, third and fourth lateral displays to the fourth lateral display, the first lateral display, the second lateral display, and the third lateral display, respectively.

12. The method of claim 11, wherein the executing the single image drag on the second lateral display, in the plane of the second lateral display, from top to bottom rotates the first image by 90 degrees from top to bottom in a plane of the front display.

* * * * *